Patented Oct. 20, 1942

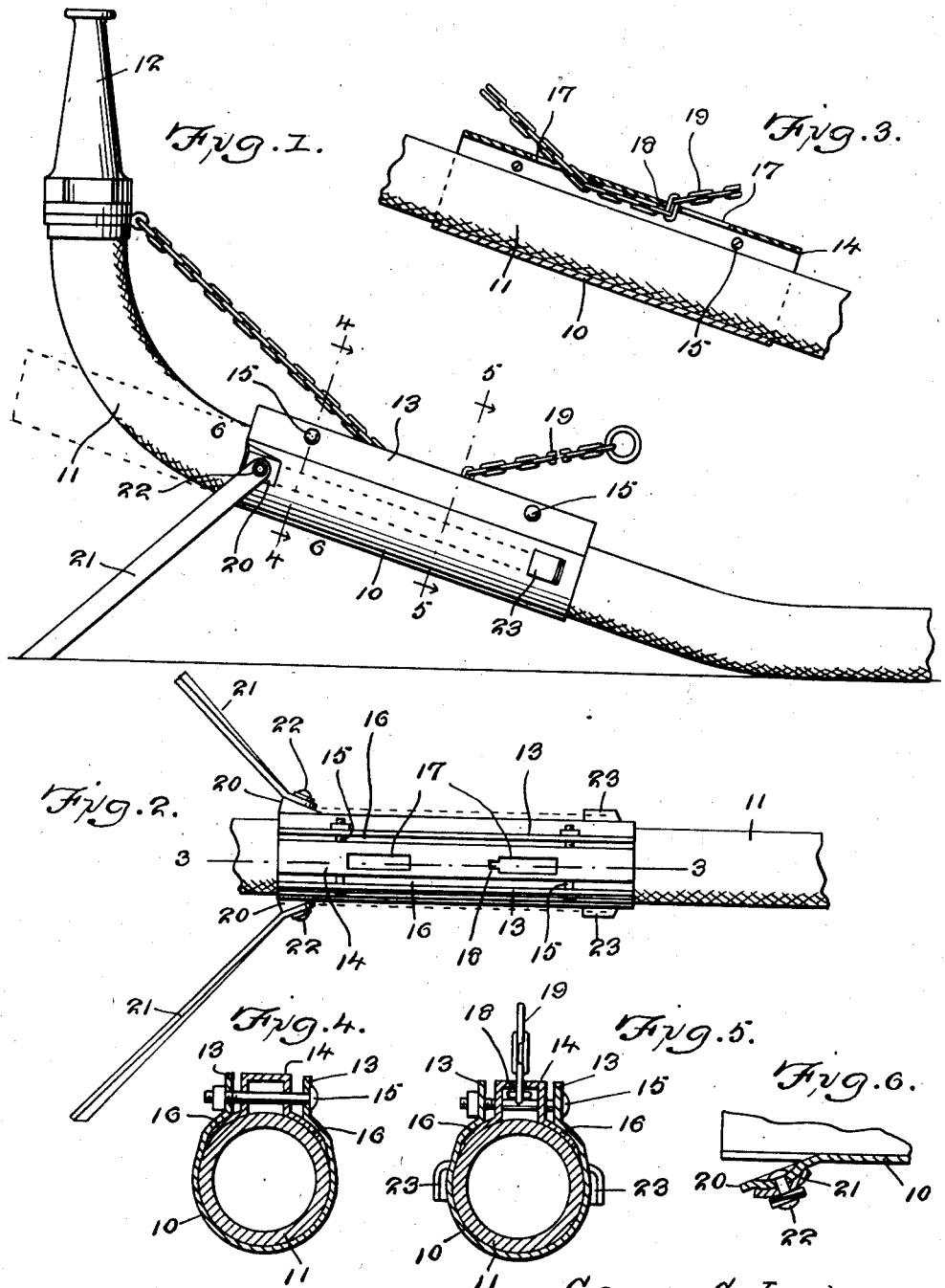

2,299,629

UNITED STATES PATENT OFFICE 2,299,629

HOSE JACK

George C. Jordan, Milwaukee, Wis.

Application August 13, 1941, Serial No. 406,696

3 Claims. (Cl. 248—83)

This invention relates to a hose jack and has for an object to provide a hose jack which is easily adjusted to a garden hose to hold the hose in any desired position for sprinkling or spraying.

Another object of the invention is to provide a hose jack which is permanently attached to the hose so that it will not become lost or mislaid, and which is always ready for use when desired.

A further object is to provide a hose jack which will permit any type of nozzle or spray head to be used without changing any part of the device.

A further object is to provide a device of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a view of the device in side elevation attached to a hose.

Figure 2 is a top plan view of the device shown attached to a hose.

Figure 3 is a longitudinal sectional view taken on the line 3—3 of Figure 2.

Figure 4 is a cross sectional view taken on the line 4—4 of Figure 1 looking in the direction of the arrows, with the chain removed.

Figure 5 is a cross sectional view taken on the line 5—5 of Figure 1 looking in the direction of the arrows.

Figure 6 is a detail sectional view taken on the line 6—6 of Figure 1.

Referring now to the drawing in which like characters of reference designate similar parts in the various views, 10 designates a split tube adapted to be applied to the hose 11 close to the nozzle 12. The tube 10 is provided with flanges 13 which extend upwardly from the longitudinal edges thereof and which are equal in length to the tube 10.

A channel bar 14 is positioned between the flanges 13 and retaining bolts 15 pass through the flanges 13 and bar 14. The channel bar is provided at its lower edges with curved flanges 16 which are located between the tube 10 and hose 11. The channel bar is provided in its top side with front and rear slots 17, the front wall of the rear slot being notched as shown at 18.

A chain 19 is secured at one end to the hose 11 at the base of the nozzle 12 and passes downwardly through the front slot and upwardly through the rear slot in the channel bar. A link of the chain engages the notch 18 of the rear slot to secure the nozzle 12 in angular position with relation to the horizontal. The chain 19 may be adjusted with relation to the channel bar 14 to vary the angular position of the nozzle 12.

Front end portions 20 of the tube 10 are outwardly deflected and legs 21 are pivoted as shown at 22 to the portions 20. Near its rear end, the tube 10 has portions thereof struck outwardly to provide clamps 23 for holding the legs 21 in folded position.

In operation the tube 10 is placed over the hose 11 near the nozzle 12, and is secured by the bolts 15. The pair of folding legs 21 which are pivotally secured to the front end of the tube 10 are received within the clamps 23 at the rear end of the tube 10 when not in use. The chain 19 for adjusting the hose 11 at any angle desired may be pulled through slots 17 and pulled tight and then locked in the notch 18 in the channel bar 14.

From the above description it is thought that the construction and operation of the invention will be fully understood without further explanation.

What is claimed is:

1. A hose jack for holding a hose in any desired adjustment comprising, a split tube adapted to be applied to a hose close to a nozzle, said tube being provided with flanges extending upwardly from the longitudinal edges thereof of equal length to the tube, a channel bar positioned between the flanges of the split tube and being provided at its lower edges with curved flanges located between the tube and hose, the channel bar being provided in its top side with front and rear slots, said rear slot being notched, a chain adapted to be secured at one end to the hose near the nozzle and engaged through said slots, a link of the chain engaging the notch of the rear slot to secure the nozzle in angular adjusted position, legs pivotally secured to the front end of said tube, and struck-out portions near the rear end of the tube for holding the legs in folded position on the tube.

2. A hose jack, comprising a tube adapted to be removably connected to a hose close to a nozzle, said tube provided with a raised longitudinally extending portion having front and rear slots, said rear slot being notched, and a chain adapted to be detachably connected to a nozzle and passing inwardly through the front slot and outwardly through the rear slot and co-operating with the notch, whereby the chain is held in its adjusted position.

3. A hose jack, comprising a split tube adapted to be applied to a hose close to a nozzle, said tube being provided with flanges extending upwardly from the split in the tube, a channel bar positioned between the flanges, bolts passing through the channel bar and the flanges, the channel bar being provided in its top side with front and rear slots, said rear slot being notched, and a chain adapted to be detachably connected to a nozzle and passing through the front slot and outwardly through the rear slot and co-operating with the notch, whereby the chain is held in its adjusted position.

GEORGE C. JORDAN.